United States Patent
Pires dos Reis Moreira et al.

(10) Patent No.: US 12,223,370 B2
(45) Date of Patent: Feb. 11, 2025

(54) OPERAND DATA PROCESSING USING INSTRUCTION MESSAGE QUEUES

(71) Applicant: Snap Inc., Santa Monica, CA (US)

(72) Inventors: Orlando Miguel Pires dos Reis Moreira, Eindhoven (NL); Gokturk Cinserin, Son en Breugel (NL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/494,605

(22) Filed: Oct. 25, 2023

(65) Prior Publication Data

US 2024/0054032 A1  Feb. 15, 2024

Related U.S. Application Data

(63) Continuation of application No. 17/627,315, filed as application No. PCT/EP2020/069970 on Jul. 15, 2020, now Pat. No. 11,842,230.

(30) Foreign Application Priority Data

Jul. 15, 2019 (EP) ..................... 19186361

(51) Int. Cl.
G06F 9/54 (2006.01)
(52) U.S. Cl.
CPC .................. *G06F 9/546* (2013.01)
(58) Field of Classification Search
None
See application file for complete search history.

(56) References Cited

U.S. PATENT DOCUMENTS

| 2006/0179429 A1 | 8/2006 | Eggers et al. |
| 2011/0072243 A1 | 3/2011 | Qiu et al. |
| (Continued) | | |

FOREIGN PATENT DOCUMENTS

| EP | 3767465 A1 * | 1/2021 |
| EP | 3999964 A1 | 5/2022 |
| (Continued) | | |

OTHER PUBLICATIONS

"U.S. Appl. No. 17/627,315, 1.312 Amendment filed Oct. 20, 2023", 9 pgs.

(Continued)

*Primary Examiner* — Charles E Anya
(74) *Attorney, Agent, or Firm* — Schwegman Lundberg & Woessner, P.A.

(57) ABSTRACT

A processing device may include a message management facility and a message processing facility. The message management facility comprises a first message queue for receiving new instruction messages and a second message queue for receiving rejected instruction messages. The message processing facility receives a first instruction message and a second instruction message from the message management facility. The first instruction message is rejected and returned to the message management facility to add the first instruction message to the second message queue in response to determining that the first instruction message cannot be accepted by a processing device element identified in the first instruction message. Operand data for an input port of a processing device element identified in the second instruction message is retrieved in response to determining that the second instruction message can be accepted by the processing device element identified in the second instruction message.

20 Claims, 10 Drawing Sheets

(56) References Cited

U.S. PATENT DOCUMENTS

2016/0098276 A1    4/2016  Du et al.
2019/0386930 A1*  12/2019  Shrivastava ........ H04L 67/1001
2022/0276915 A1    9/2022  Pires Dos Reis Moreira et al.

FOREIGN PATENT DOCUMENTS

| EP | 3999964 B1 | 8/2023 | |
| WO | WO-9516967 A1 * | 6/1995 | ....... G06F 15/17381 |
| WO | WO-9908195 A1 | 2/1999 | |
| WO | WO-2021009207 A1 | 1/2021 | |
| WO | WO-2021048442 A1 * | 3/2021 | ............... G06F 1/04 |

OTHER PUBLICATIONS

"U.S. Appl. No. 17/627,315, Non Final Office Action mailed Mar. 30, 2023", 11 pgs.
"U.S. Appl. No. 17/627,315, Notice of Allowance mailed Jul. 21, 2023", 10 pgs.
"U.S. Appl. No. 17/627,315, Preliminary Amendment filed Jan. 14, 2022", 12 pgs.
"U.S. Appl. No. 17/627,315, Response filed Jun. 27, 2023 to Non Final Office Action mailed Mar. 30, 2023", 13 pgs.
"European Application Serial No. 19186361.2, Extended European Search Report mailed Dec. 10, 2019", 9 pgs.
"European Application Serial No. 19186361.2, Noting of loss of rights mailed Aug. 11, 2021", 2 pgs.
"European Application Serial No. 20737491.9, Intention to Grant mailed Feb. 21, 2023", 35 pgs.
"International Application Serial No. PCT/EP2020/069970, International Preliminary Report on Patentability mailed Jan. 27, 2022", 8 pgs.
"International Application Serial No. PCT/EP2020/069970, International Search Report mailed Oct. 9, 2020", 4 pgs.
"International Application Serial No. PCT/EP2020/069970, Written Opinion mailed Oct. 9, 2020", 6 pgs.
Shirazi, B., et al., "A Data Driven Multiprocessor—Its Architecture and Performance Evaluation", Microprocessing and Microprogramming, vol. 26, No. 2, (Jun. 1, 1989), 97-112.

* cited by examiner

| dt | step | Q1 | Q2 | State | Item | PATH | OPER | RES |
|---|---|---|---|---|---|---|---|---|
| 0 | 0 | R1 L2 R0 L1 L0 | | Unset | L0 | | | |
| | 1 | R1 L2 R0 L1 | L1 | L_set | L1 | Q1-L | | L1 |
| | 2 | R1 L2 R0 | L1 L1 | L_reserved | R0 | Q1-Q2 | | L1 |
| | 3 | R1 L2 | L2 L1 L1 | Wait | L2 | Q1-R | R0 x L0 | L1 |
| | 4 | R1 | R1 L2 L1 L1 | Wait | R1 | Q1-Q2 | | L1 |
| | 5 | | R1 R1 L2 L1 | Wait | | Q1-Q2 | | L1 |
| 1 | 6 | R3 L5 R2 L4 L3 | R1 L2 | L_set | L2 | Q2-L | | L2 |
| | 7 | R3 L5 R2 L4 L3 | L2 L2 R1 | L_reserved | L2 | Q2-Q2 | | L2 |
| | 8 | R3 L5 R2 L4 L3 | L2 L2 L2 R1 | Wait | R1 | Q2-R | R1xL1 | L2 |
| | 9 | R3 L5 R2 L4 | L3 L3 L2 L2 L2 | Wait | L3 | Q1-Q2 | | L2 |
| | 10 | | L4 L4 L3 L3 L2 R2 L5 R3 | Wait | L4, R2,L5, R3 | Q1-Q2 | | L2 |
| 2 | 11 | R5 R4 | R3 L5 R2 L4 | L_set | L3 | Q2-L | | L3 |
| | 12 | R5 R4 | R3 L5 R2 L4 L3 | L_reserved | L3 | Q2-Q2 | | L3 |
| | 13 | R5 R4 | R3 L5 R2 L4 L3 | L_reserved | L4 | Q2-Q2 | | L3 |
| | 14 | R5 R4 | R3 L5 R2 L4 L3 | Wait | R2 | Q2-R | R2xL2 | L3 |
| | 15 | R5 R4 | R3 L5 L4 L3 | Wait | L5, R3 | Q2-Q2 | | L3 |

FIG. 9

OPERAND DATA PROCESSING USING INSTRUCTION MESSAGE QUEUES

CLAIM OF PRIORITY

This application is a continuation of U.S. patent application Ser. No. 17/627,315 (Now, U.S. Pat. No. 11,842,230), filed on Jan. 14, 2022, which is a U.S. national-phase application filed under 35 U.S.C. § 371 from International Application Serial No. PCT/EP2020/069970, filed on Jul. 15, 2020, and published as WO 2021/009207 on Jan. 21, 2021, which claims the benefit of priority to EP Patent Application Serial No. 19186361.2, filed on Jul. 15, 2019, each of which is incorporated herein by reference in its entirety.

BACKGROUND

A dataflow architecture is a computer architecture that directly contrasts the traditional von Neumann architecture or control flow architecture. Dataflow architectures do not have a program counter (in concept): the executability and execution of instructions is solely determined based on the availability of input arguments to the instructions so that the order of instruction execution is unpredictable, i.e. behavior is nondeterministic. In dataflow processors, ports of a processing device element may receive operand data from mutually different, non-synchronized sources. By way of example, this situation is schematically shown in FIG. 1 for a dual-port processing element PE shown in FIG. 2, which receives a stream of operand data for a left operand port L and a right operand port R. Whereas operand data for a particular input port may be ordered, the arrival of left and right operand data typically is not synchronized. In the example the processing element has to perform an operation on pairs of operand data L0, R0; L1, R1; . . . ; Ln, Rn etc. In the more general case, a processing element may have more than two input ports and it may have to perform an operation on m-tuples of mutually synchronized operand data. In the example shown the processing device element having received the operand data L0 cannot proceed until it has received the corresponding operand data R0. Once it has received R0 it can performed the computation on L0, R0, but it has to wait for L1 before it can proceed with the computation on L1, R1. To avoid that the operand data conveyed with the message is lost, the processing device element may have queues PEQ1, PEQ2, to buffer the operand data that it has received, but which it cannot yet process because it is waiting for the corresponding other operand data. This requires however a substantial storage space, in particular in a processing device having a processing cluster with a large plurality of processing device elements.

It is noted that US2006179429 discloses a microarchitecture and instruction set that supports multiple, simultaneously executing threads. The approach relates to a microarchitecture called "WaveScalar." WaveScalar is a compiler that breaks a control flow graph for a program into pieces called waves having instructions that are partially ordered (i.e., a wave contains no back-edges), and for which control enters at a single point. In one aspect of this approach, instructions are provided that enable and disable wave-ordered memory. Additional memory access instructions bypass wave-ordered memory, exposing additional parallelism. Also, a lightweight, interthread synchronization is employed that models hardware queue locks. Finally, a simple fence instruction is used to allow applications to handle relaxed memory consistency.

It is further noted that SHIRAZI B ET AL: disclose "A data driven multiprocessor-Its architecture and performance evaluation", in MICROPROCESSING AND MICROPROGRAMMING, ELSEVIER SCIENCE PUBLISHERS, BV., AMSTERDAM, NL, vol. 26, no. 2, 1 Jun. 1989 (1989-06-01), pages 97-112, XP026670885, ISSN: 0165-6074, DOI: 10.1016/0165-6074(89)90261-5 [retrieved on 1989-06-01]. The system disclosed therein consists of m host modules, connected through a network, and n processing modules, under the control of the host modules. Each host module is augmented with a data structure module which holds the data structures and controls the data structure operations. Program blocks are distributed among host modules. These blocks are carried out by the processing modules in parallel and under the control of the host modules.

SUMMARY

It is an object of the present invention to provide measures that enable a proper synchronization of operand data for computation by the processing device elements with modest data storage requirements.

This object is achieved in a processing device comprising at least one processing cluster that comprises a message management facility and a message processing facility having a plurality of processing device elements with at least two input ports.

The message management facility has a first message queue, a second message queue and a queue controller. In operation, the message management facility receives new instruction messages in the first message queue and it receives bounced instruction messages, i.e. instruction message that could not yet be accepted by a processing element, in the second message queue. The queue controller in operation selectively provides an instruction messages from one of the first message queue and the second message queue.

In operation, the message processing facility receives the selected instruction messages from the message management facility and either accepts or rejects the selected instruction messages. If it cannot accept the selected instruction message, it returns the rejected instruction messages as a bounced instruction message to the message management facility. If it accepts the instruction message, it retrieves the operand data conveyed by the message and provides it to the input port of a processing device element identified by the accepted instruction message.

When during operation it is determined that all input ports of a processing device element have received operand data the processing device element performs the operation on the operand data. The processing device element may then provide an output message conveying the result of the operation.

In the improved processing device, a processing cluster has a first and a second queue shared by the plurality of processing device elements.

In the case that the processing device elements were to individually buffer operand data, each of these processing device elements would require a buffer space sufficiently large to buffer a predetermined number of operand data which the processing device elements have to be capable to accept before stalling. In the improved processing device, a shared buffer space is available. It is less likely that all processing device element have said predetermined number at the same time, so that the storage space required for the first and the second queue can be substantially smaller than the required storage space that would be required in case the processing device elements were to individually buffer operand data.

BRIEF DESCRIPTION OF THE DRAWINGS

FIG. 9 shows a sequence of states assumed in said state diagram upon receipt of an exemplary stream of input messages.

DETAILED DESCRIPTION OF EMBODIMENTS

Figure 1:
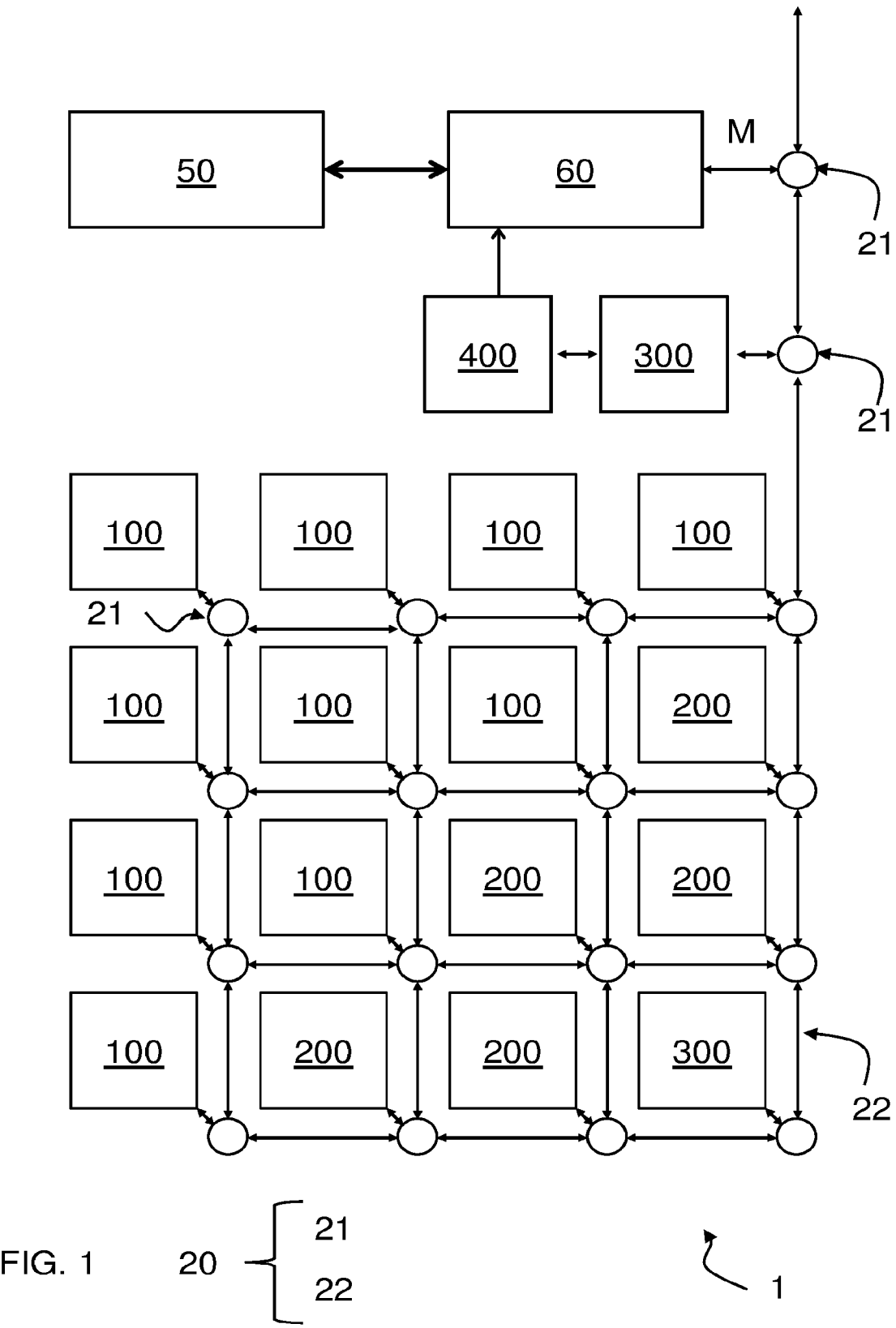
FIG. 1 schematically shows a data processing system.

FIG. 1 schematically shows a data processing system 1 comprising data processing system clusters 100, 200, 300 that are coupled to each other in a message exchange network 20 to enable a communication between the processing system clusters by an exchange of event messages. Different types of messages may be exchanged. One of these types is an instruction message, which comprise an indication of a processing device element, an identification of an input port of the processing device element and operand data for that input port. Other types of messages exchanged may be configuration messages to configure a data processing system clusters or an individual processing device element for a particular task, or energy-mode messages for power consumption control.

The message exchange network 20 may comprise a respective network interface 21 for each processing system cluster and network connections 22. In the embodiment shown the data processing system may comprise processing system clusters that are dedicated to perform a particular class of computations. For example processing system clusters 100 may be dedicated to perform basic arithmetic computations, processing system clusters 200 may be dedicated to neuromorphic computations, and processing system clusters 300 may be dedicated to perform complex mathematic operations. Alternatively, processing system clusters may be provided that are capable to be reconfigured to perform one of various classes of operations. Likewise, a processing system cluster may have a plurality of data processing system elements that may mutually have a same functionality or have mutually different functionalities or may be reconfigured to have a particular functionality.

As shown in FIG. 1, the data processing system 1 may further comprise a mapping facility 60 that is configured to selectively map event messages. Therewith it is achieved that data processing clusters may not only transmit event messages directly, but that they can also indirectly have their messages redirected and broadcasted via the mapping facility 60.

In the embodiment shown in FIG. 1, the data processing system 1 further comprises an input facility 50 to receive data from a data array of separately addressable array elements comprising a respective data value. The input facility 50 is configured to transmit data event messages having a message content indicative for their data value via the message exchange facility. The mapping facility 60 determines the destination of the event messages using the mapping function, and the array element address and/or the data value are message source data provided as input to the mapping function.

As shown in FIG. 1, The data processing system 1 may further comprise a region selection facility 400 that serves to identify one or more regions of interest in the data array. The region selection facility 400 is configured to control the mapping facility 60 to achieve that it provides for a mapping of these one or more regions to respective destinations in the data processing system. The regions of interest to be mapped may be determined statically, e.g. an operator may define these regions upon configuring the system. Alternatively, or additionally regions of interest to be mapped may be determined dynamically. In the embodiment shown this is achieved in that the data processing system 1 further comprises a feedback controller 300 that uses classification results from the data processing system to control the region selection facility 400. As shown in FIG. 1, data processing system clusters 100, 200, may transmit their classification results as messages via the message exchange facility 20 to the feedback controller 300.

Figure 2:
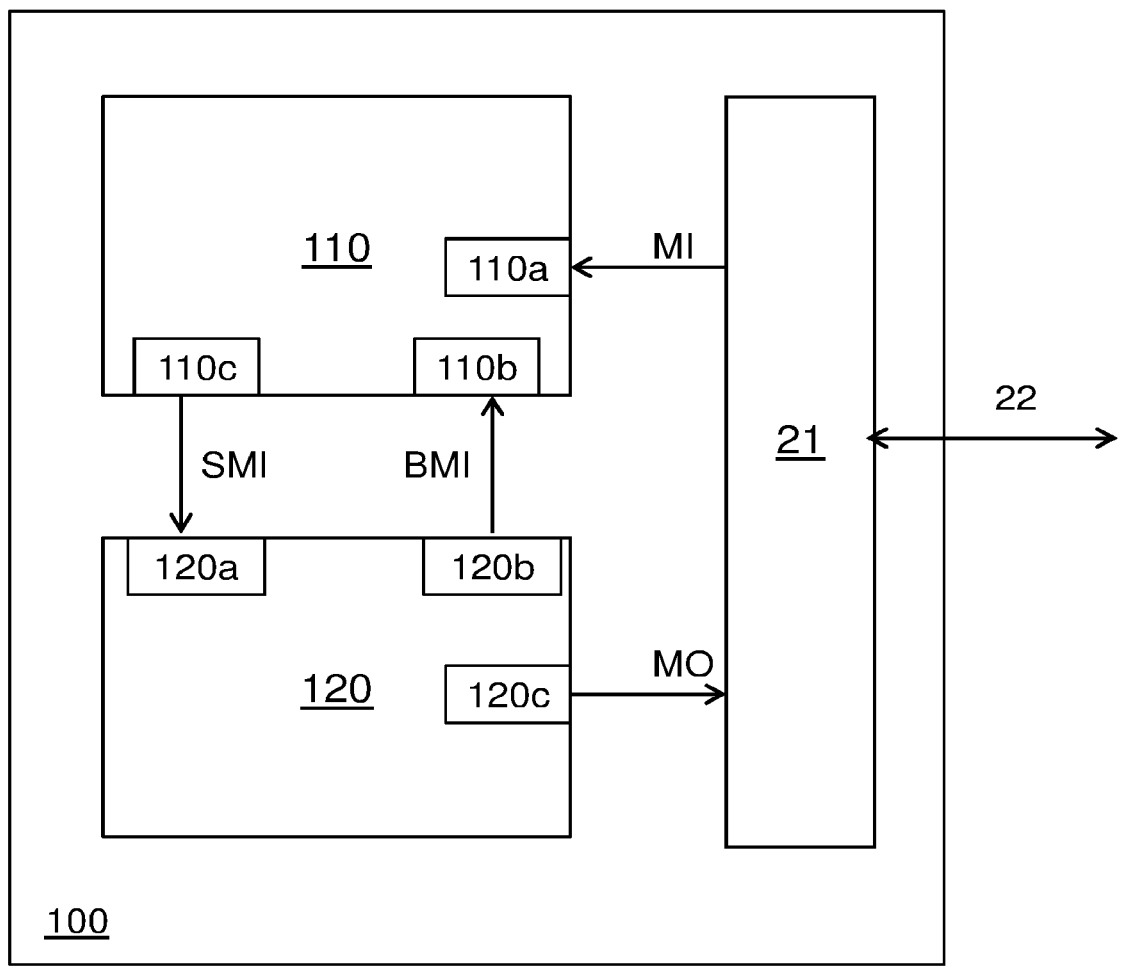
FIG. 2 schematically shows a processing device.

FIG. 2 schematically shows a processing device with a processing cluster 100 with a network interface 21 having a link 22 coupled to the network. As schematically shown in FIG. 2, the processing cluster 100 further comprises a message management facility 110 and a message processing facility 120. As shown in more detail in FIG. 3, the message management facility 110 has a first message queue Q1, a second message queue Q2 and a queue controller Q-CNTRL. In operation, the message management facility 110 receives new instruction messages MI from input 110a in the first message queue Q1 and it receives bounced instruction messages BMI from input 110b in the second message queue Q2. The message management facility 110 has a queue controller Q-CNTRL (see FIG. 3) that at its output 110c provides an instruction message SMI, selected by multiplexer MUX from one of the first message queue Q1 and the second message queue Q2.

The processing cluster 100 further comprises a message processing facility 120. As shown in more detail in FIGS. 3, 4 the message processing facility 120 has a plurality of processing device elements PE1, ..., PEj, ... PEn, with at least two input ports. In operation, the message processing facility 120 receives at input 120a the selected instruction messages SMI from the message management facility 110 and either accepts or rejects the selected instruction message SMI. If it cannot accept the selected instruction message SMI it returns that message at output 120b as a bounced instruction message BMI to the message management facility 110. If it accepts the selected instruction message SMI and it retrieves from the selected instruction message operand data for a specific input port of a processing device element identified by the selected instruction message. When it is determined that a processing device element has received operand data for each of its input ports the operation designated to that processing device element is performed and subsequently, an output messages MO is transmitted that conveys the result of the operation on the received operand data. The output message MO may be provided as a new instruction message for further processing by the same processing device element or another processing device element, or may be transmitted to an output device, for example a host computer.

Figure 3:
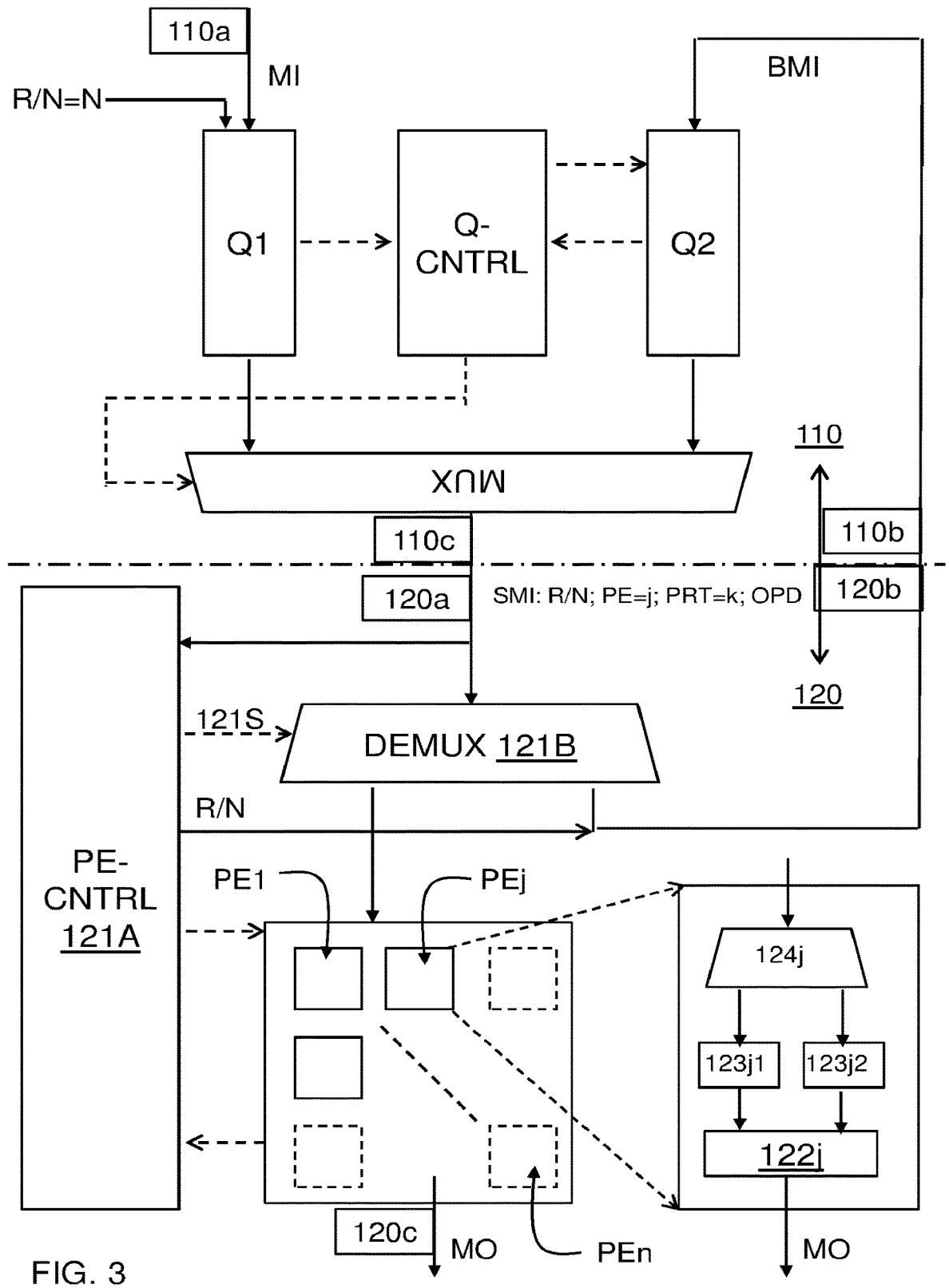
FIG. 3 shows an embodiment of the processing device in more detail.

FIG. 3 shows an embodiment of processing cluster 100 with a message receiving facility 110 and a message processing facility 120 in more detail.

In operation the queue controller Q-CTRL initially designates the first instruction message queue Q1 as the designated queue from which it fetches the messages to be provided to the message processing facility 120. It subsequently designates in an alternating manner one of the first instruction message queue Q land the second instruction message queue Q2 as the designated queue from which the instruction messages for the message processing facility 120 are to be fetched. Therein the queue controller Q-CTRL can maintain the designation of the first instruction message queue Q1 for an arbitrary amount of cycles before it selects the second instruction message queue Q2. It may for example maintain the designation of the first instruction message queue Q1 until it is empty, but it may alternatively maintain the designation for a lesser number of instruction message fetching cycles. Once it has designated the second instruction message queue Q2 it maintains its designation until all instruction messages that bounced during the previous selection of the first message queue Q1 were fetched once.

Figure 5:
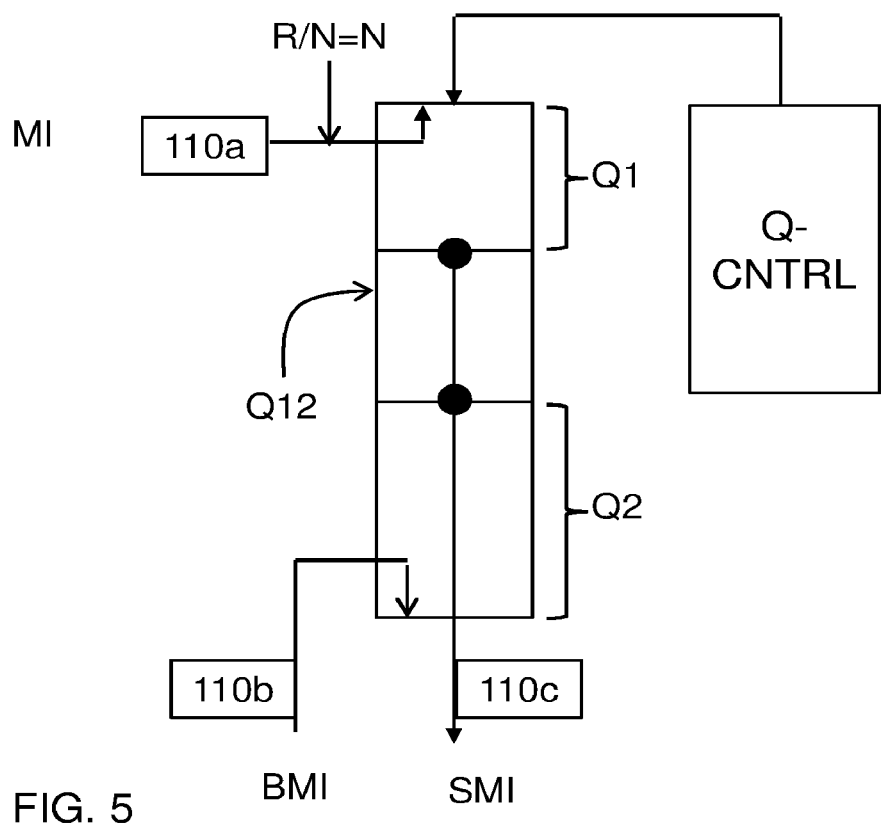
FIG. 5 shows a further module in a further embodiment of the processing device in more detail.

In the embodiment shown in FIG. 3, the first and the second message queue Q1, Q2 are provided in a respective memory unit. Alternatively, as shown in FIG. 5, the first message queue Q1, and the second message queue Q2 may be provided in a respective address range of a single addressable memory Q12. A more efficient memory usage may be achieved in this embodiment. For example, the first message queue Q1 may begin at a first end of the address range of the single addressable memory Q12. and the second message queue Q2 at an opposite end of the address range. A selection of a message from the first or the second queue takes place by the controller Q-CNTRL by specifying the address of the single addressable memory Q12 where the last element on the first queue Q1, or the last element of the second queue Q2 resides. The single addressable memory Q12 may have a single physical memory port for accepting new messages MI, bounced messages BMI and to issue the selected messages SMI. Alternatively one or two additional memory ports may be provided for this purpose.

In the embodiment shown in FIG. 3, the processing device elements PE1, . . . , PEm, . . . , PEn have a respective computation facility. As shown therein for example, processing device element PEj has computation facility 122*j* to perform a designated operation. In the embodiment shown, it is presumed that the processing device element PEj has a first and a second input port 123*j*1, 123*j*2. The processing device element PEj may have a proper demultiplexing element 124*j* to direct received operand data to a proper one of its input ports. The nature of the computations to be performed by the computation facility 122*j*, and the number of input ports may be predetermined by its architecture. Alternatively, these characteristics may be configurable, for example by a separate configuration message.

The processing cluster 100 has a PE-controller PE-CNTRL 121A that determines whether or not a selected instruction message SMI from the message management facility 110 can be accepted. If it determines that a selected instruction message SMI cannot be accepted, it returns the selected instruction messages SMI via routing element 121B as a bounced instruction message BMI to the message management facility 110. If, on the other hand, it determines that the selected instruction message SMI can be accepted, it directs the selected instruction message SMI to the processing device element j identified by the selected instruction message, so that the latter can retrieve operand data from the accepted selected instruction message SMI for its input port k designated in the message.

If it is determined that therewith each of the input ports of that processing device element have been provided with operand data it can perform an operation designated thereto and an output messages MO conveying the result of the operation on the received operand data can be transmitted.

Figure 4:
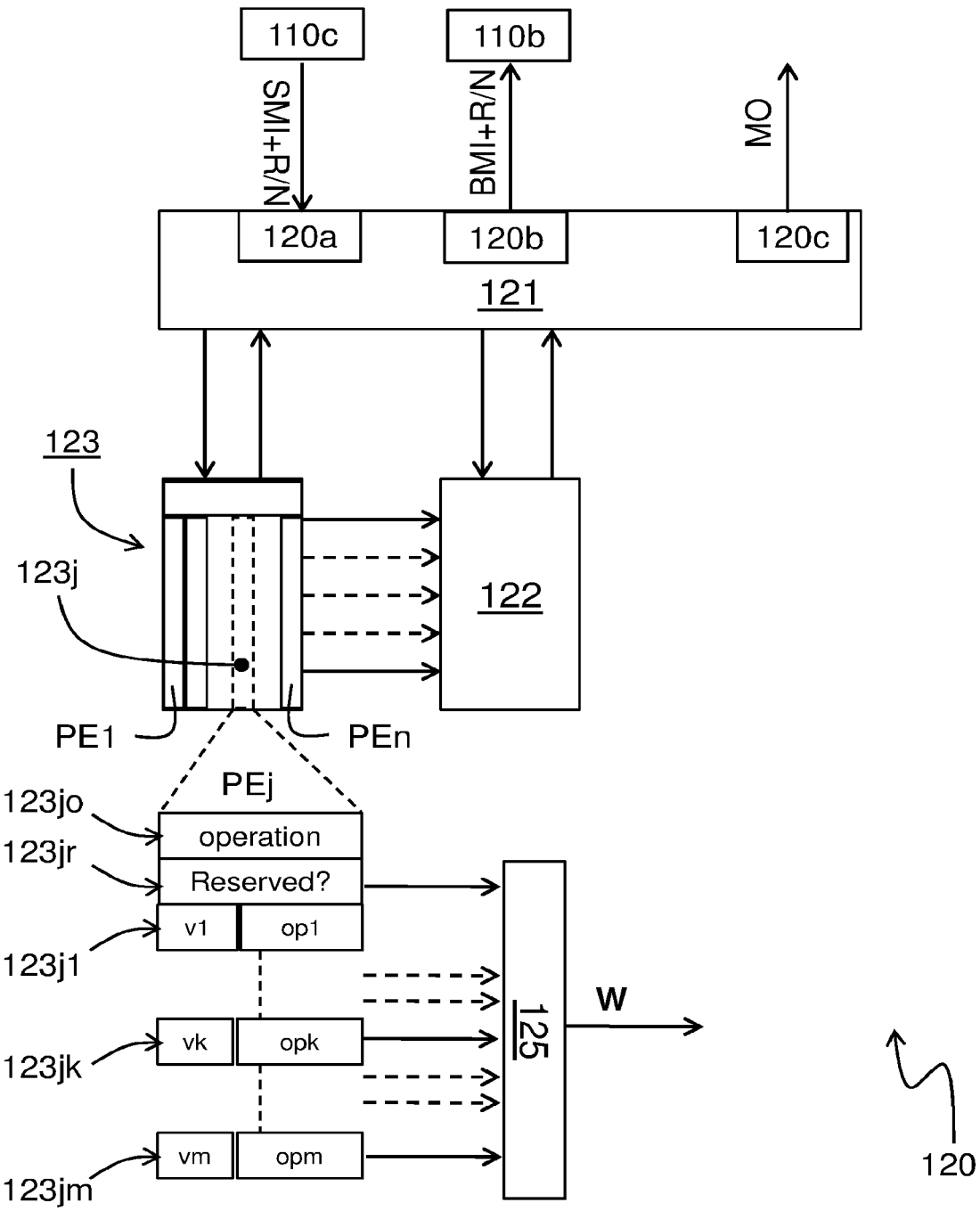
FIG. 4 shows a module in another embodiment of the processing device in more detail.

FIG. 4 shows an alternative embodiment. Contrary to the embodiment of FIG. 3, the processing device elements PE1, . . . , PEj, . . . , PEn in the processing cluster 100 have a shared computation facility 122 to perform a designated operation. In this embodiment, each of the processing device elements PE1, . . . , PEj, . . . , PEn has a respective addressable memory location e.g. 123*j* for processing device element PEj that comprise respective processing device element state information. In the example shown, the respective addressable memory location e.g. 123*j* comprises a field 123*jo* indicating an operation to be performed. Alternatively a single operation field may be provided in the shared computation facility 122, or the shared computation facility 122 may perform an operation which is predetermined by its architecture. In the example shown, the respective addressable memory location e.g. 123*j* further comprises a field 123*jr* that indicates the existence R of a reserved message for the processing element.

As shown further in this example, the respective addressable memory location e.g. 123*j* further comprises a respective field 123*j*1, . . . , 123*jk*, . . . , 123*jm*, for each input port. Although in the most common case two input ports may be used, the disclosure is not limited thereto. As further shown in FIG. 4, the operand fields contain operand data and an indicator to indicate whether or not the operand data is valid. For example operand field 123*jk* includes operand data opk and indicator vk to indicate validity of that operand data.

The processor element further has a logic element 125 to determine whether or not a wait state, as indicated by signal W is present. The wait signal W has a logical value True if there exists a reserved message and if all its ports are free.

It is noted that in the embodiment of FIG. 3, the processing device element state information may be either maintained by the PE-controller PE-CNTRL 121A or by the processing device elements themselves. Also, this information may be distributed. For example, the processing device elements PE1, . . . , PEj, . . . , PEn, may store the operand data for their ports and the PE-controller PE-CNTRL may maintain the information concerning the reservation state of the processing device elements and the information about the validity of the operand data.

Figure 6:
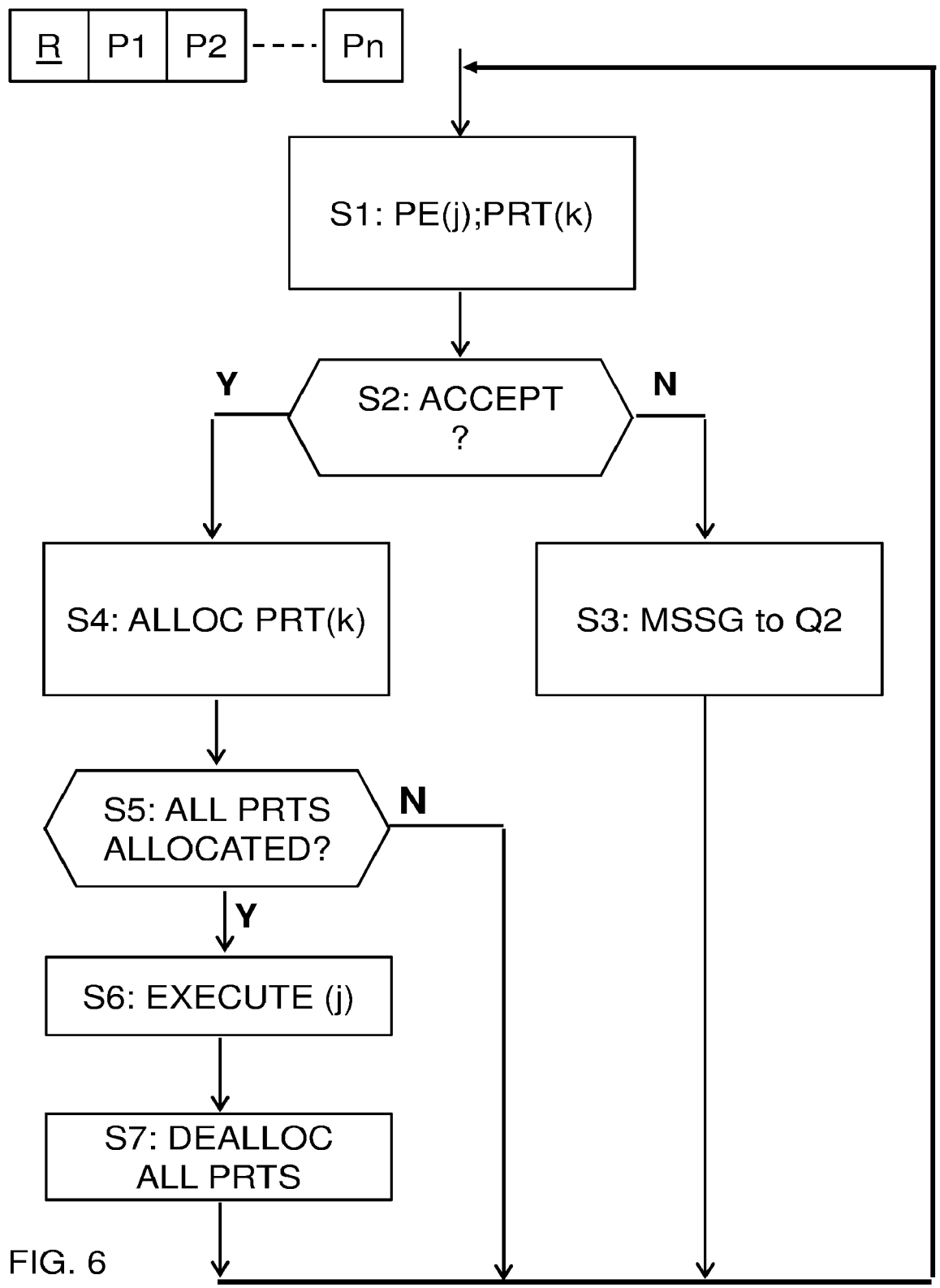
FIG. 6 schematically shows an embodiment of operating a processing device.
Figure 7:
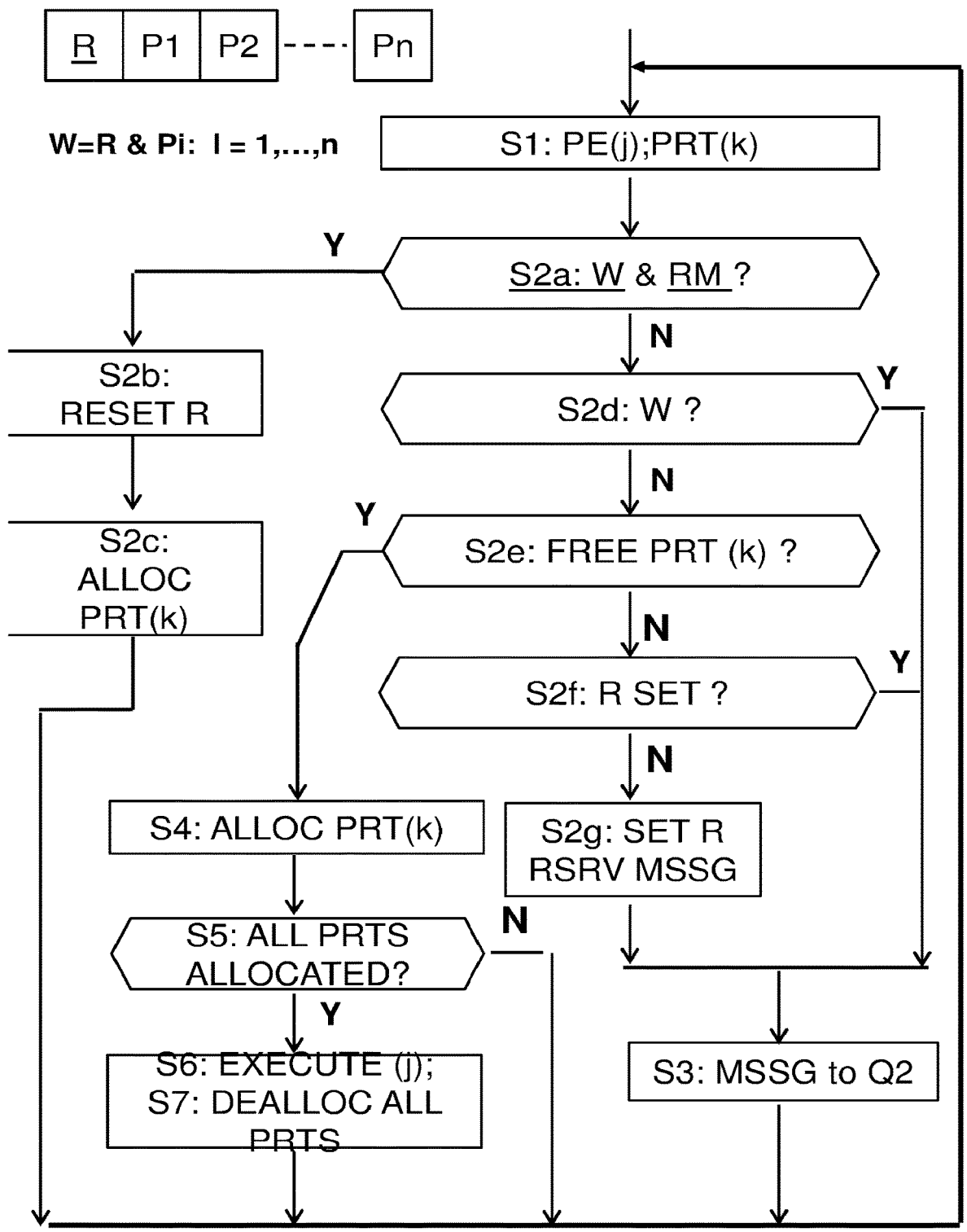
FIG. 7 shows an example of this embodiment in more detail.

An operation of a processing device is described now in more detail with reference to FIG. 6 and FIG. 7. FIG. 6 shows the main steps of the operation and FIG. 7 shows the operational steps in more detail. References to FIG. 7 are shown in brackets below. During operation instruction messages IM are received in a first instruction message queue Q1. An instruction messages designates one of the processing device elements in the cluster, and comprises operand data for a selected one of a plurality of its ports. This operand data is to be used by the designated processing device element as input for an operation assigned thereto. A second process, as schematically illustrated in FIG. 6, 7 then determines how the messages are further handled and processed.

As schematically shown in FIG. 6, in a first stage of the second process, one or more instruction messages SMI from a designated instruction message queue. The designated instruction message queue is initially the first instruction message queue Q1 and subsequently, the first message queue Q1 and the second message queue Q2 are alternatingly designated as the designated queue from which a series of one or more instruction messages are fetched.

In a next stage S2, it is determined for each retrieved instruction message SMI whether it can be accepted (Y) or is to be rejected (N). If the instruction message is rejected (S2+N) it is transferred in a third step S3 to the second instruction message queue Q2 and the procedure continues with selecting (S1) a further instruction message SMI.

If on the other hand, the retrieved instruction message is accepted (S2+Y), the selected port (k) of the designated processing device element (j) receives in a fourth step (S4) the operand data (OPD) from the retrieved instruction message. Therewith the selected port is allocated. It is subsequently determined in a fifth stage S5 if therewith all ports of the designated processing device element (j) are allocated. If this is not the case (S5+N) the procedure continues with selecting (S1) an instruction message SMI.

If it is determining (S5+Y) however, after allocation of the selected port (k) that therewith all ports are allocated, the designated processing device element (j) is controlled to execute (S6) an operation with the operands received at its ports. Subsequently its ports are deallocated (S7) and the procedure continues with selecting (S1) an instruction message SMI.

FIG. 7 illustrates in more detail an embodiment, wherein a reservation indicator (R) is provided that indicates that the processing system element (j) has labeled an instruction message which it sent to the second queue Q2 as a reserved message. The reserved message is the first message of a same operation for which it is determined that the corresponding port was allocated. The reservation indicator is used to determine a wait status (W). The wait status is valid for a processing system element (j) if its reservation indicator (R) is true and all its ports are free (deallocated).

In the embodiment shown in FIG. 7, the procedure of determining (S2) whether or not an instruction message (SMI) can be accepted (Y) or is to be rejected (N) comprises a first sub-step of evaluating (S2a) if the wait status is valid and if the selected instruction message (SMI) is a reserved message.

Upon determining that both conditions are complied with, the reservation condition is reset in sub-step S2b, the designated port (k) is allocating in sub-step S2c with the operand data conveyed by the message and the procedure continues with selecting (S1) an instruction message SMI.

If it is determined that one or both conditions are not complied with, further processing depends on a determination (S2d) of whether or not the wait status is valid;

Upon determining (S2d+Y) that the wait status is valid, the message is transferred (S3) to the second instruction message queue Q2 and the procedure continues with selecting (S1) an instruction message SMI.

If on the other hand it is determined (S2d+N) that the wait status is not valid, it is subsequently determined (S2e) whether or not the port (k) designated by the instruction message is free.

Upon confirming (S2e+Y) that the designated port (k) is free, the designated port step is allocated (S4) with the operand data conveyed by the message and the procedure continues with step S5 as previously described.

If however it is determined (S2e+N) that the designated port (k) is not free, it is subsequently determined (S2f) whether the reservation indicator (R) is set, If this is the case, (S2f+Y) the procedure continues with the step of transferring (S3) the message to the second instruction message queue (Q2).

If (S2f+N) the reservation indicator (R) was not yet set, it is set in sub-step S2g and the instruction message is labeled as reserved message before transferring (S3) the message to the second instruction message queue (Q2).

Figure 8:
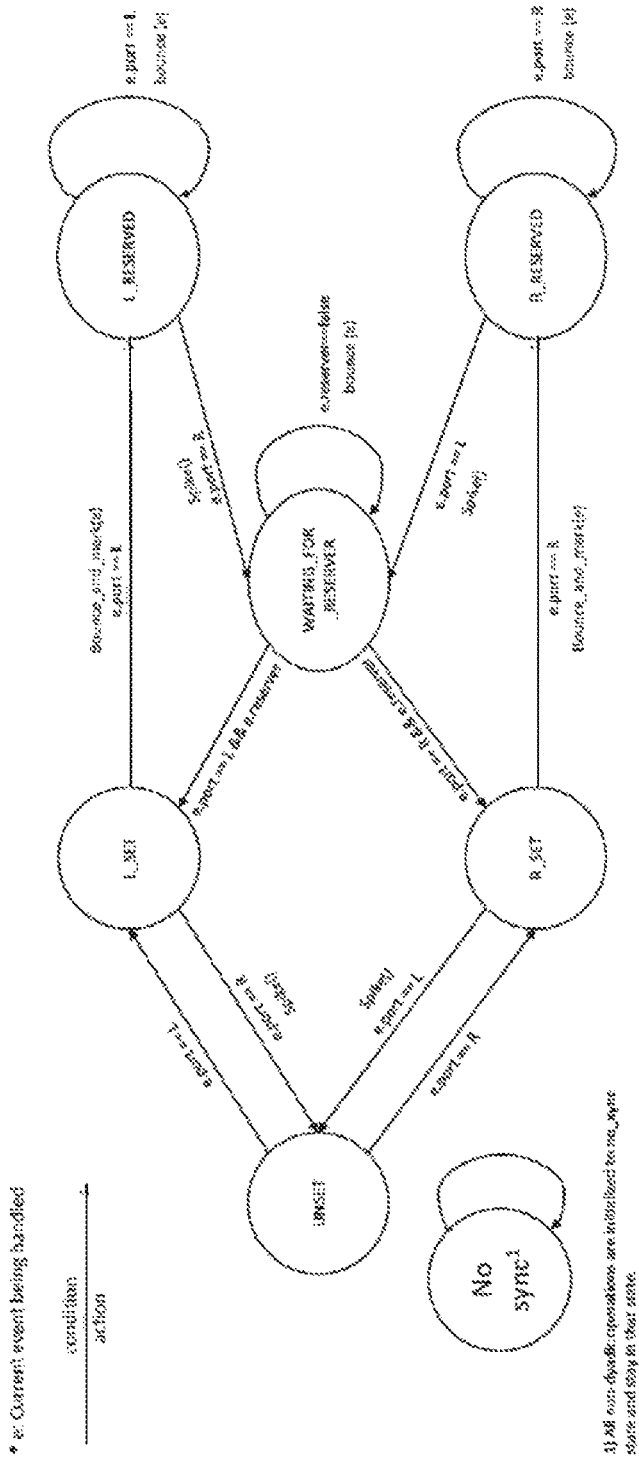
FIG. 8 shows a state diagram of an embodiment of the data processing system.
Figure 10:
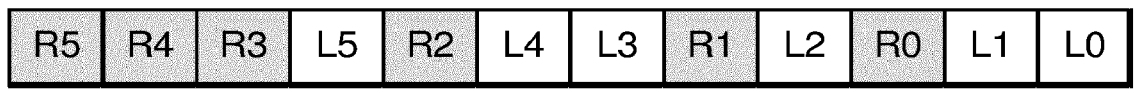
FIG. 10 shows an exemplary stream of input messages.
Figure 11:
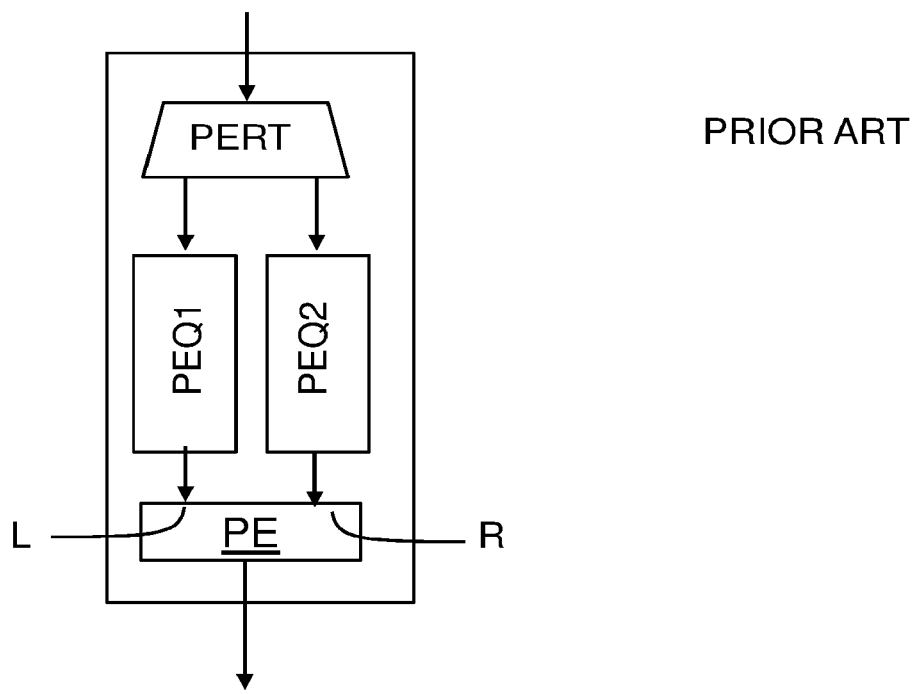
FIG. 11 shows a prior art approach.

An exemplary operation is demonstrated in FIGS. 8, 9, presuming that the processing cluster receives the exemplary data stream of FIG. 10.

FIG. 9 shows in a first column an indication of time (dt) and in a second column enumerated steps (step). The third and the fourth column respectively show the content of the first and the second queue Q1, Q2 (Q1,Q2), the fifth column shows a state (State) assumed in the state diagram of FIG. 8. The sixth column shows the instruction message (Item) which is currently being handled. The seventh column shows the data path (PATH). The eighth column shows an operation which is performed (OPER). The tenth column shows a message reservation status (RES). In column seven the data path is indicated by its source (Q1 or Q2) and by its destination (Q2,L,R), wherein L and R are the left and right port of a processor element. For clarity it is presumed that all messages have the same processing element as their destination. Accordingly the operation is determined by the state of that single processing element in that step. However, in practice the messages may have mutually different processing elements as their destination. For each message, the state of the destination processing element determines how the message is handled and the state of that destination processing element is accordingly updated.

Initially, in step 0, at point in time dt=0, the state of the processor element is unset. Initially, the first message queue Q1 is designated as designated queue from which instruction messages are fetched. The first queue has received input messages L0, L1, R0, L2, R1, in the order from right to left in FIG. 9. In step 1 input message L0 is accepted and its operand data is provided to the L-port of the processing element. The state of the processing element changes to L set to reflect that this port is occupied. In step 2, input message L1 cannot be accepted because the designated port L is occupied. The input message is marked as reserved message and transferred to Q2. Also the state of the processing element changes to L-reserved to reflect that it waits for a reserved message. In step 3, the R-port receives the operand from message R0 and it proceeds with the operation R0xL0, i.e. a function of the two operands, not necessarily a multiplication. It is noted that the operands are not necessarily scalars. By way of example the processing element may perform an addition of two vector operands or a multiplication of all elements of a vector with a same scalar operand. The processing element assumes the state Wait (reserved message in queue and all ports free), so that it will not accept any message before it has received the reserved message L1. Accordingly, in steps 4 and 5, the remaining messages of Q1 are transferred to Q2. When Q1 is empty or earlier, the procedure continues with Q2. In step 6, message L1 is accepted and its operand is consumed by the L-port. The processor element status changes to L set. The reserved indicator is set to false, as the processor element has just consumed the reserved message. The second queue Q2 remains the designated one, until all instruction messages therein which were received therein during the previous designation of Q1 are fetched once again. Hence, in step 7 it fetches instruction message L2. Because the L-port is occupied and the reservation state is not yet valid, the reservation state is now set to valid, and the instruction message L2 is returned, labeled as a reserved message, to Q2. In step 8, it fetches instruction message R1 from Q2. The processing element can accept the operand conveyed by this message R1 in its R-port and proceeds with the operation R1xL1. The processor element again assumes the wait state, so that it does not accept any other instruction message before it has received the reserved instruction message L2. At this point, all instruction messages received by the second queue Q2 during the previous designation of Q1 have been provided once again to the processing element, and Q1 is designated again as designated queue. Q1 in the meantime subsequently has received fresh instruction messages L3, L4, R2, L5, R3. All instruction messages are refused now, and added to the second queue, because the processor element indicates that it waits for a reserved message. Therewith the operational state as shown in step 10 is achieved. Here the second queue is designated again. In step 11, the reserved instruction message L2 is fetched, and its operand is provided to the L-port, which is allocated therewith. The next instruction message L3 is bounced in step 12 as a reserved instruction message. The subsequent instruction message L4 is bounced in step 13 (not labeled as reserved). In step 14 instruction message R2 is fetched, and the processor element can execute operation R2xL2. The processor element assumes the wait state as all its ports ae free, and there is a reserved message in Q2. Accordingly also instruction messages L5, R3 are returned to Q2 as unreserved messages, and subsequently, processing can continue with fresh elements R4, R5 from Q1.

What is claimed is:

1. A method of operating a processing device having a plurality of processing device elements, the method comprising:
    receiving a plurality of instruction messages, the plurality of instruction messages comprising new instruction messages that are received in a first message queue and rejected instruction messages that are received in a second message queue, each instruction message identifying a processing device element of the plurality of processing device elements, an input port of the processing device element, and operand data for the input port of the processing device element;
    in response to determining that a first instruction message of the plurality of instruction messages cannot be accepted by the processing device element identified in the first instruction message:
        rejecting the first instruction message, and
        adding the first instruction message to the second message queue; and
    in response to determining that a second instruction message of the plurality of instruction messages can be accepted by the processing device element identified in the second instruction message, retrieving the operand data for the input port of the processing device element identified in the second instruction message.

2. The method of claim 1, comprising:
    retrieving instruction messages from a designated one of the first message queue and the second message queue by alternatingly designating the first message queue and the second message queue as the designated one, the retrieved instruction messages including the first instruction message and the second instruction message.

3. The method of claim 2, wherein the first message queue is initially designated as the designated one.

4. The method of claim 1, wherein the first message queue and the second message queue are each provided in a respective address range of a single addressable memory.

5. The method of claim 1, comprising:
    providing, for each processing device element, a reservation indicator that indicates whether an instruction message added to the second message queue was labeled as reserved.

6. The method of claim 5, comprising:
    setting the reservation indicator of an identified processing device element of the plurality of processing device elements as true based on labeling of an instruction message as reserved; and
    in response to the setting of the reservation indicator as true and detecting that all input ports of the identified processing device element are free, setting a state of the identified processing device element to a wait state.

7. The method of claim 6, wherein, when in the wait state, the identified processing device element does not accept any other instruction message before it has received the instruction message labeled as reserved.

8. The method of claim 1, comprising:
    in response to detecting that the input port and at least one other input port of the processing device element identified in the second instruction message have received operand data, performing an operation assigned to the processing device element identified in the second instruction message.

9. The method of claim 8, further comprising:
    providing an output message conveying a result of the operation.

10. The method of claim 1, wherein the plurality of processing device elements form part of a processing cluster of the processing device.

11. The method of claim 10, wherein the processing cluster is one of a plurality of processing clusters in a message exchange network.

12. A processing device comprising:
    a message management facility configured to receive a plurality of instruction messages comprising new instruction messages that are received in a first message queue and rejected instruction messages that are received in a second message queue, each instruction message identifying a processing device element of a plurality of processing device elements of the processing device, an input port of the processing device element, and operand data for the input port of the processing device element; and
    a message processing facility comprising the plurality of processing device elements, the message processing facility being configured to receive a first instruction message of the plurality of instruction messages and a second instruction message of the plurality of instruction messages from the message management facility, reject and return the first instruction message to the message management facility to add the first instruction message to the second message queue in response to determining that the first instruction message cannot be accepted by the processing device element identified in the first instruction message, and retrieve the operand data for the input port of the processing device element identified in the second instruction message in response to determining that the second instruction message can be accepted by the processing device element identified in the second instruction message.

13. The processing device of claim 12, wherein the message management facility comprises a queue controller that retrieves instruction messages from a designated one of the first message queue and the second message queue by alternatingly designating the first message queue and the second message queue as the designated one, the retrieved instruction messages including the first instruction message and the second instruction message.

14. The processing device of claim 13, wherein the first message queue is initially designated as the designated one.

15. The processing device of claim 12, wherein the first message queue and the second message queue are each provided in a respective address range of a single addressable memory.

16. The processing device of claim 12, wherein each processing device element has a reservation indicator that indicates whether the processing device element has labeled an instruction message added to the second message queue as reserved.

17. The processing device of claim 16, wherein a state of the processing device element is adjustable to a wait state to indicate that the reservation indicator of the processing device element is true and all input ports of the processing device element are free, and when in the wait state, the processing device element does not accept any other instruction message before it has received the instruction message labeled as reserved.

18. The processing device of claim 12, wherein each processing device element has a respective computation facility to perform assigned operations.

19. The processing device of claim 12 wherein the plurality of processing device elements have a shared computation facility to perform assigned operations.

20. A processing system comprising a plurality of processing clusters, each processing cluster comprising:

a message management facility configured to receive a plurality of instruction messages comprising new instruction messages that are received in a first message queue and rejected instruction messages that are received in a second message queue, each instruction message identifying a processing device element of a plurality of processing device elements of the processing cluster, an input port of the processing device element, and operand data for the input port of the processing device element; and a message processing facility comprising the plurality of processing device elements, the message processing facility being configured to receive a first instruction message of the plurality of instruction messages and a second instruction message of the plurality of instruction messages from the message management facility, reject and return the first instruction message to the message management facility to add the first instruction message to the second message queue in response to determining that the first instruction message cannot be accepted by the processing device element identified in the first instruction message, and retrieve the operand data for the input port of the processing device element identified in the second instruction message in response to determining that the second instruction message can be accepted by the processing device element identified in the second instruction message.

* * * * *